US012688763B2

(12) United States Patent
Halliwell et al.

(10) Patent No.: US 12,688,763 B2
(45) Date of Patent: Jul. 21, 2026

(54) TAMPER-RESISTANT SECURITY FOR ARTWORKS AND COLLECTIBLES

(71) Applicants: Steven Halliwell, Irvington, NY (US); Anne Halliwell, Irving, NY (US)

(72) Inventors: Steven Halliwell, Irvington, NY (US); Anne Halliwell, Irving, NY (US)

( * ) Notice: Subject to any disclaimer, the term of this patent is extended or adjusted under 35 U.S.C. 154(b) by 240 days.

(21) Appl. No.: 18/445,821

(22) Filed: Feb. 20, 2024

(65) Prior Publication Data

US 2024/0331513 A1 Oct. 3, 2024

Related U.S. Application Data

(60) Provisional application No. 63/576,584, filed on Feb. 21, 2023.

(51) Int. Cl.
*G08B 13/06* (2006.01)
*G08B 13/24* (2006.01)

(52) U.S. Cl.
CPC ......... *G08B 13/06* (2013.01); *G08B 13/2434* (2013.01)

(58) Field of Classification Search
CPC G08B 13/06; G08B 13/2434; G08B 13/2417; B32B 37/00; G09F 3/0232
See application file for complete search history.

(56) References Cited

U.S. PATENT DOCUMENTS 4,330,586 A 5/1982 Fieux
6,765,054 B1 * 7/2004 Jones ................. C09J 123/0853 524/499
7,061,831 B2 * 6/2006 De La Huerga ........ A61J 1/035 221/129
7,098,794 B2 * 8/2006 Lindsay ............... G06K 19/072 340/572.3
7,102,522 B2 * 9/2006 Kuhns .................. G06K 19/073 340/572.1
7,460,015 B2 * 12/2008 Forster ............. G06K 19/07345 340/10.5
7,477,151 B2 * 1/2009 Forster ............. G06K 19/07345 340/10.5

(Continued)

FOREIGN PATENT DOCUMENTS

| | | | |
|---|---|---|---|
| CN | 1584913 | A | 2/2005 |
| CN | 114519412 | A | 5/2022 |
| WO | WO2012025700 | A2 | 3/2012 |

OTHER PUBLICATIONS

Kantareddy et al; "Long range battery-less PV-powered RFID tag sensors" https://arxiv.org/abs/1909.05818 Sep. 12, 2019.

*Primary Examiner* — Hoi C Lau

(57) ABSTRACT

An effective battery-less tamper-resistant security device can be affixed to an artwork or collectible by a heat-activated non-invasive non-destructive adhesive such as high melt point BEVA. The security device includes a label and a transceiver technology chip (e.g. RFID and/or NFC) and an antenna (e.g. printed using conductive ink). One or more layers of sensors, such as a temperature sensor, may also be provided. A high peel strength adhesive compatible with the heat-activated adhesive attaches the security device to the heat-activated adhesive and thus the artwork. The security device can detect and report nefarious use of solvents, heat, bending, tearing, or physical removal. Methods of manufacture and utilization of the anti-tamper security device are also provided.

20 Claims, 5 Drawing Sheets

(56) References Cited

U.S. PATENT DOCUMENTS 7,705,734 B2 * 4/2010 Martinelli .............. G06Q 10/08
215/202
7,812,706 B2 * 10/2010 Suzuki ................... G06K 19/04
343/776
7,872,579 B2 * 1/2011 Rancien ........... G06K 19/07749
340/5.86
7,973,664 B1 * 7/2011 Lambert ................ B65D 51/20
340/572.8
8,094,027 B2 * 1/2012 Yang ................. B29C 45/14008
340/572.1
8,144,016 B2 * 3/2012 Rancien ............... G06K 19/025
340/5.86
8,395,504 B2 * 3/2013 Furuichi ............ G06K 19/0776
340/568.1
8,427,316 B2 * 4/2013 Bielas ................ G06K 19/0739
343/718
8,884,764 B2 11/2014 Forster
9,594,996 B2 * 3/2017 Glasgow ................ G06Q 10/00
9,623,699 B2 4/2017 Ritter et al.
9,626,620 B2 * 4/2017 McDowell ......... G06K 19/0776
9,928,722 B2 * 3/2018 Glasgow ................ G06K 19/07
10,332,380 B2 * 6/2019 Glasgow ................ G08B 21/18
10,692,349 B2 * 6/2020 Glasgow ................ G06K 19/07
11,282,368 B2 * 3/2022 Glasgow ................ G08B 21/18
11,587,426 B2 * 2/2023 Glasgow .......... G06Q 10/06398
11,764,974 B2 9/2023 Norton et al.
12,159,556 B2 * 12/2024 Amino .................. B32B 27/302
12,542,039 B2 * 2/2026 Perez ................. G08B 13/2462
2005/0230960 A1 * 10/2005 Bilodeau ............... G09F 3/0292
283/75
2005/0242957 A1 * 11/2005 Lindsay ........... G06K 19/07767
343/893
2006/0180647 A1 8/2006 Hansen
2007/0247317 A1 10/2007 Farrell
2008/0291020 A1 11/2008 Rodgers
2009/0128340 A1 5/2009 Masin
2009/0237249 A1 * 9/2009 Bielas .............. G06K 19/07798
340/572.1
2009/0303044 A1 * 12/2009 Furuichi .......... G06K 19/07381
340/568.1
2011/0102153 A1 * 5/2011 Rancien ................... G07D 7/01
340/10.1
2015/0068672 A1 3/2015 Tsay et al.
2017/0140676 A1 * 5/2017 Iwasawa ................... B32B 7/12
2020/0057876 A1 2/2020 Chang
2021/0350433 A1 11/2021 Lee et al.
2024/0331513 A1 * 10/2024 Halliwell ........... G08B 13/2434

* cited by examiner

TAMPER-RESISTANT SECURITY FOR ARTWORKS AND COLLECTIBLES

CROSS-REFERENCE TO RELATED APPLICATION

This application claims the priority of U.S. Provisional Application Ser. No. 63/576,584 filed Feb. 21, 2023, the disclosure of which is hereby incorporated by reference herein.

FIELD OF THE INVENTION

This invention relates to digital registration, logistics management and security for works of art and collectibles from loss, theft, forgery and counterfeiting.

BACKGROUND

The arts and collectibles market has historically suffered from poor record keeping, poorly maintained inventory processes, and lack of reliable methods to track the location of a specific object, even within a museum's storerooms or an art gallery. The lack of efficient operations in both private and public art institutions has gone hand in hand with loss, theft, forgery and sale of counterfeit works. Doubts about the authenticity of art and collectibles has been the rule, not the exception, and has damaged the public perception of the fine art and collectibles markets. Sales receipts are often lost, the identity and provenance of works becomes untraceable by heirs, and certificates of authenticity are often of dubious authenticity themselves. Faced with lawsuits from angry owners, many respected scholars refuse to opine any longer on the authenticity of works.

The problem has become more serious as prices for works have escalated in recent years. In the fine art market, up to 40 percent of works offered for sale, by some estimates, are stolen or inauthentic. In some cases, a work is painted in the style of an established artist and the artist's signature forged on the work; or a work by a known artist is copied, fraudulently signed, and the counterfeit sold as the original work. Similarly, labels are counterfeited for fine wines, rare books and maps are stolen from museums and archives, rare coin packaging is peeled off and counterfeit objects inserted. Financial institutions and insurance firms looking to lend against or insure works face many issues of authenticity and legitimacy of claims to title.

Transceiver technologies such as RFID or NFC allow users to assign a unique identifier to an object in order to broadly identify, track, monitor and locate inventory efficiently, control devices remotely. RFID has found use in security. For example, RFID tags attached to the label of apparel items in a retail establishment can report an attempt to remove the tag. NFC tags offer many of the same benefits as RFID, but are read only at a very short distance.

This differential between NFC and RFID tags is a function of the limitation on read range of NFC tags to two inches or less. Other microchip-based transceiver technologies that might be used as an embodiment of the present invention would be subject to similar read-range constraints. NFC tags may not be reliably read through artistic media or related material. A framed painting, for example, with an NFC tag on the verso of the frame may not be readable from the face of the work. Similarly, a stone sculpture with an NFC tag on the base may not be readable when an RFID tag would respond to an inquiry.

RFID has found widespread use in supply chain management. Information transmitted from the chip provides detailed information for consumer and industrial goods on the product's origins, physical attributes, date of production, as well as current location. Applied to art, RFID technology allows members of the art "supply chain" (artists, dealers, gallerists, collectors, publicists, auction houses, financial lenders, conservators, storage companies and others) to keep reliable records of the movement of works of art. The advent of blockchain (or for that matter any other database capable of storing and sharing transaction information in a controlled and systematic way) has the potential to provide trusted information similar to supply chain information (e.g., artist, date of creation, provenance) on a work of art. An RFID tag or RFID tag with sensors according to this invention provides a highly reliable link between a physical work of art and the information contained in a blockchain entry or other registry if the digital descriptor applies to a physical work of art. In the case of blockchain entries referring to purely digital creations, an RFID tag or RFID tag with sensors can provide a link between physical records of the work and its blockchain or other database registration.

Recent improvements in the quality of online digital imagery, changes in buying behavior by younger collectors and Covid-related market limitations have contributed to an increase in online sales and, consequently, to the desirability of creating blockchain registrations of works. As a result, the importance of "anchoring" a physical work's authenticity to a digital file or blockchain registration via a secure communicating device has increased.

Sensors have also found use in security. Sensor systems can detect (sense) and report temperature, humidity, barometric pressure, location and other changes in the physical condition of an object. Used in conjunction with RFID tags, sensors can monitor the condition of works at a given location and while in transit between locations.

Commercially available RFID tags and sensor systems known to the inventors do not meet the needs of, and are not suitable for, security for works of art and collectibles. Anti-tamper tags on works of art or collectibles must be sensitive to attempts to remove a tag via peeling, cutting, solvents, heat and other means while remaining not visible to the viewer, and also satisfy an art industry prohibition against change in any manner of the condition of a work of art or collectible. This means that chemical infiltration, contraction, expansion or softening of the materials to which it is applied, or changes in the work's appearance when displayed are not acceptable. Tags with RFID and sensors or other communicating devices for the arts and collectible markets designed to prevent tampering or removal of the tag must also satisfy the absolute prohibition on any potential alteration to the work's appearance, condition, or chemical composition to the satisfaction of professionals involved in the industry, including curators, appraisers, conservators, dealers, gallerists, art historians, insurers, financial service companies, museum directors and collectors.

Even the smallest change in a work's condition will reduce its value and raise questions about its authenticity. Users of the present invention will most likely place a tag on a proximate surface (a painting's stretcher, backing or frame, a print or photograph's matting, for example) but the present invention may when required be placed directly on the back of a work of two-dimensional art, or on a non-critical surface (i.e., one not of aesthetic significance) of a sculpture or collectible item. Tags of various sizes, shapes, read ranges and antenna configurations will be required to protect diverse works of art.

Further, in order to be acceptable to the art and collectibles market, an RFID tag or RFID tag with sensors must be fully reversible without altering or leaving any residue on a work of art or collectible. Removal of the tag may, for example, be required during conservation of a work, or may be a condition of purchase by a collector who prefers anonymity.

NFC (Near Field Communication) tags may be used as embodiments of the present invention when the tamper-resistant features of the device are of paramount concern in the verification of a work's identity, but the reporting features provided by RFID (e.g., alarms or messages upon tampering, tracking movement of works within or between facilities) are of less concern.

Thus, it is an object of the present invention to provide a tag that provides a unique identifier to a work, enhances inventory management, tracks works, resists and reports tampering, preferably also is counterfeiting-resistant, provides data that, when read, confirms the validity of a database or blockchain entry to which it refers, provides when read authenticating data about the work, and adapted to attach without damage to the work, in order to provide protection against loss, theft, forgery and counterfeiting, and designed to become inoperable, send an alarm, or in other ways notify to a user or monitoring service when subjected to efforts to subvert its purpose.

SUMMARY OF THE INVENTION

The invention includes a multi-layer, tamper-responsive security device, sometimes referred to as a "tag", that includes as elements at least RFID, NFC or other transceiver components, namely, an electronic integrated circuit (or "chip") and an antenna. Thus, security devices according to this invention are or include radio frequency identification (RFID) tags. Certain embodiments are only RFID or NFC tags; others additionally include sensors on the tag, and sometimes referred to those as "RFID/NFC and sensor tags." Certain embodiments also have power sources such as batteries, thermoelectric generators or other similar devices located on or near the tag. The circuitry comprises an integrated circuit for receiving, storing and processing information, and either printed circuitry or etched metal (aluminum, copper, silver or other conductive metals or materials) pathways.

The RFID tag or tag portion may be active or semi-active, that is, include an on-board battery in addition to the circuitry and antenna. An active tag transmits, either periodically or upon activation by a tampering event, a signal to an RFID reader. Similarly, one or more sensors of an active or semi-active RFID with sensors tag transmit signals to the RFID reader or to a separate or integrated (with RFID electronics) sensor reader. A security device having an active tag may include a geolocator for tracking purposes, if desired. Alternatively, the tag may be passive, that is, without battery and activated only when in the presence of an active reader, for example, an active RFID reader that transmits radio energy to the tag as it interrogates the tag. In that case the circuitry includes means for modulating and demodulating an RF signal, and for collecting DC power from an incident reader signal. NFC tags, alternatively, are powered through inductive coupling at close range. A semi-active tag includes features of both active and passive tags, using the on-board battery power only when activated by an RFID/NFC or sensor reader. Certain preferred embodiments of tags according to this invention are passive tags, more preferably passive UHF RFID tags, with or without one or more sensors, and most preferably RFID/NFC tags, with or without sensors, comprising an integrated-circuit chip and antenna circuitry.

Sensors may be additively located with the RFID components. When an active reader transmits an encoded signal to interrogate it, the RFID tag or RFID/NFC tag with sensors receives the message through its antenna and responds with its identification, preferably its unique Electronic Product Code (EPC) serial number or other identification number designated by a Collection Management System and an indication of tampering, if such has occurred. Indication of tampering may be a unique signal from an active, semi-active, or passive tag, or it may be lack of response, indicating that the tag has been incapacitated. An RFID/NFC tag with sensors may transmit additional information.

An RFID/NFC tag of a security device according to this invention comprises a thin layered structure, more fully described hereinafter. Certain embodiments include a thin substrate. By effect of its thin design as well as other factors described herein including materials and adhesives, the structure will be altered from efforts to peel it, cut it, remove it with solvents, remove it with heat, or by other means. If the result of tampering is an impaired ability to connect to readers, the loss of integrity will result in a lack of signal or an alarm sent to the monitoring system when a periodic report is due from an active tag or when a passive tag is interrogated. In some embodiments, the tampering will activate sensors capable of reporting, pressure, solvents, heat, changes in location, or other critical factors. Sensor data will be reported via the RFID/NFC circuit and antenna or in some embodiments independently. In the embodiment that includes sensors and an RFID/NFC tag, the sensor assembly can be placed either closer to or farther from the object's surface, if the RFID/NFC and sensor assemblies are on different layers of the tag as illustrated in exploded view in FIG. 1A. Alternatively, the sensor assembly can be placed adjacent to or separated from the RFID/NFC tag on the work of art or collectible as shown in FIG. 1B. Once adhesively fixed to a work of art or collectible, the RFID/NFC tag or tag portion is sensitive to tampering through one or more of physical force, solvents and heat. A tag according to the invention, once adhesively affixed to a work of art or collectible, generates a tampering signal or becomes incapacitated by removal or attempted removal, as by pulling off, peeling off, even with the aid of a solvent, or heating to release the adhesive affixing it to a work of art or collectible. Certain embodiments further include additional functionality, including but not limited to one or more means to thwart counterfeiting. NFC embodiments follow the same parameters.

An RFID or NFC tag portion according to this invention may be applied in conjunction with a label that includes anti-counterfeiting means. It may also be applied in conjunction with other anti-tampering means, for example, a tamper-evident foil that crumples upon an attempt to peel or pull the tag and thereby provides a visual indication of tampering, such as by revealing a "Void" message, chemicals that change color upon tampering, or an invisible chemical identifier ("taggant") incorporated into the tag.

The term "artwork" as used herein is used in its broad sense and includes, for example and not by way of limitation, paintings done in oil, acrylic, watercolors, and other materials, drawings, lithographs, prints, silk screens, photographs, certain artistically designed books, etchings, works made of fabric or found materials, sculptures created from metal, stone, clay, or other materials, constructions, documents certifying unique or limited-edition rights to performance art, instructions to constructions or designs, devices (electronic or otherwise) created for presenting performances of art, video art, digital art (including NFTs or "non-fungible tokens") and carvings done in wood, metal or other materials. The term "collectibles" is also used in its broad sense and includes, for example and not by way of limitation, antiques, books, maps, coins, stamps, musical instruments, antique automobiles, autographs, baseball cards, comic books, sports memorabilia, fine wines and spirits. The term "applied directly to a surface of an artwork or a collectible" or its equivalent includes stretchers, frames, and other ancillary elements of an artwork or a collectible.

As used herein "high peel strength adhesive" means an adhesive with a T-peel value of >about 10 pli (pounds per linear inch) or >about one n/m (newton per meter). As used herein "non-invasive non-destructive heat activated adhesive" means an adhesive having non-invasive, non-destructive, and adhesive properties generally comparable to BEVA® 371.

Methods according to this invention include attaching by an adhesive facing the surface of the work selected for affixing the tag that can be removed completely and without residue utilizing heat, solvents, or both, without altering the surface of the work of art or collectible and without altering its chemical composition or appearance. However, as stated above, such removal will generate a signal or incapacitate the tag. Removal, in the RFID/NFC only embodiment, renders the tag permanently inoperable; in the RFID/NFC plus sensors embodiment, reuse of the sensor may be possible if separately mounted.

The invention further includes a security device of this invention adhesively affixed to a work of art or collectible by an adhesive as described above.

The invention also includes a security system for works of art and collectibles that includes a security device according to this invention and at least an RFID reader that receives signals transmitted by the device's tag or tag portion, including in some embodiments sensor signals. The RFID reader then reports any tampering of the tag by any suitable means, for example, by sounding an alarm, displaying a message, or sending a message to a computer or other suitable electronic device by wire, by far field wireless communication, by sensor hubs or by local area wireless computer network (Wi-Fi, Bluetooth, or other wireless protocols). The computer or other suitable monitoring device then reports the tampering. If a passive-tag embodiment, the reader also transmits an encoded radio signal to the security device's tag, generating a response therefrom (unless the tag has been incapacitated or removed from its monitored location without authorization). In some embodiments the security system includes a separate sensor reader and antennas. The security system also includes an adhesive affixing or, if not yet applied to a work of art or collectible, capable of affixing the security device to the surface of a work of art or collectible. If a security system is adhesively affixed to the surface of a work of art or collectible, the device and affixing adhesive according to this invention can be removed completely utilizing heat, solvents or both without altering the surface of the work of art or collectible and without altering its chemical composition or appearance.

Further, this invention includes in RFID embodiments a method for detecting and signaling an attempt to tamper with a security device according to this invention that has been affixed to a work of art or collectible, comprising the steps of: interrogating the device's tag with the receiver, detecting a response or non-response from the tag which reveals tampering, if any, and making that information available to a person responsible for security of the work of art or collectible.

According to one exemplary embodiment of the present invention there is provided a battery-less tamper-resistant security device adhesively affixable to a surface of an artwork or collectible by an appropriate adhesive. The security device includes: a) a transceiver technology chip and antenna; and b) a label operatively connected to the transceiver technology chip and antenna. Also, the transceiver technology chip and antenna send responses to signaling by a signaling device to the security device and report its status as nominal or having been tampered with; and the security device is sensitive to physical tampering or removal so that if a solvent is applied thereto affecting the antenna, or if bent, torn, or removed, the security device will report its status as having been tampered with.

The security device may further comprise a non-invasive non-destructive heat activated adhesive (e.g. high melting point ethylene vinyl acetate adhesive) associated with the label and the transceiver technology chip and antenna, with the non-invasive non-destructive adhesive affixed to a surface of an artwork or collectible. Desirably the security device further comprises a high peel strength adhesive between the non-invasive non-destructive adhesive and the transceiver technology chip and antenna. The high peel strength adhesive may comprise a rubber resin adhesive compatible with ethylene vinyl acetate adhesive, or other high peel strength adhesives similarly compatible.

Sensors may also be provided such as at least a temperature sensor operatively connected to the transceiver technology chip and antenna so that the temperature sensor will indicate if the temperature sensed is greater than a predetermined level less than the melt point of the non-invasive non-destructive adhesive and if so will report its status as having been tampered with.

In preferred embodiments the transceiver technology chip is selected from the group consisting essentially of RFID chips, NFC chips, and both RFID and NFC chips. Typically at least one electrically conductive element sensitive to bending or tearing is operatively connected to the chip and antenna; and the security device further comprises a third adhesive connecting the electrically conductive element to the label, the third adhesive having a peel strength enough less than that of the high peel strength adhesive so that if the security device is bent or torn the electrically conductive element will break and the security device will report its status as tampered with. Typically the RFID antenna is printed onto the label in an offset press while the chip is attached to the antenna with a drop of epoxy.

The chip may be mounted on a substrate such as paper having top and bottom surfaces and with the top surface having identifier information provided (e.g. printed) thereon.

According to another exemplary embodiment of the present invention there is provided a method of manufacture of a battery-less tamper proof security device using a label having top and bottom surfaces, a transceiver technology chip and antenna, adhesives, and a release sheet. The method comprises: a) using conductive ink printing an antenna and providing a transceiver technology chip on the bottom surface of the substrate {as earlier indicated the antenna is typically printed using conductive ink and the chip attached to the antenna, e. g. by a drop of epoxy); b) applying a high peel strength adhesive layer to the printed transceiver technology chip and antenna; and c) applying a heat-activated non-invasive non-destructive adhesive on a release sheet to the high peel strength adhesive layer. The method may further comprise: d) removing the release sheet; and e) heating the heat-activated non-invasive non-destructive adhesive to activate it.

In the method c) and e) may be practiced utilizing an ethylene vinyl acetate adhesive and b) may be practiced using a rubber resin adhesive compatible with ethylene vinyl acetate adhesive. Typically e) may be practiced by applying the non-invasive non-destructive adhesive directly to a surface of an artwork or collectible to provide the artwork or collectible with a security device.

The method may further comprise: f) printing identifier information for the artwork or collectible on the top surface of the label, and g) producing a layer comprising at least one sensor for sensing an environmental condition in conjunction with a) and b). In the method g) is typically practiced to provide at least a temperature sensor so that if the temperature of the security device is raised to a predetermined amount above the melting point of the non-invasive non-destructive adhesive that temperature will be sensed and reported.

According to yet another exemplary embodiment of the invention a method of providing a tamper-resistant security device for an artwork or collectible is provided comprising: a) using conductive ink printing an antenna and providing a transceiver technology chip layer; b) applying a high peel strength adhesive layer to the printed transceiver technology chip and antenna layer; c) using a heat-activated non-invasive non-destructive adhesive on a release sheet placing the heat-activated non-invasive non-destructive adhesive to a surface of an artwork or collectible; d) heating the heat-activated non-invasive non-destructive adhesive to activate it so that it is firmly secured to the artwork or collectible; e) removing the release sheet from the heat-activated non-invasive non-destructive adhesive; and f) moving the high peel strength adhesive layer into contact with the heat-activated non-invasive non-destructive adhesive so that they adhere to each other.

This method may further comprise: g) producing a layer comprising at least one sensor for sensing an environmental condition in conjunction with a) and b) and g) may be practiced to provide at least a temperature sensor so that if the temperature of the security device is raised to a predetermined amount above the melting point of the non-invasive non-destructive adhesive that temperature will be sensed and reported.

It is the primary object of the present invention to provide an effective tamper-resistant security device for an artwork or collectible and methods of manufacture and utilization thereof. This and other objects of the invention will become clear from a detailed description of the drawings and the appended claims.

DETAILED DESCRIPTION OF THE DRAWINGS

Figure 1A:
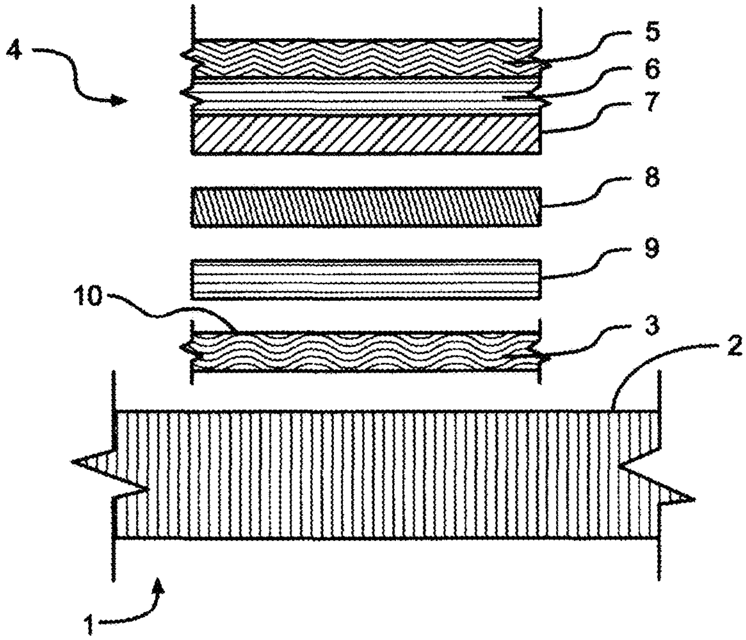
FIG. 1A is an exploded cross-sectional block diagram of an exemplary embodiment of a security device according to the invention applied to the surface of an artwork or collectible, wherein, if present, sensors are on a different layer than are the RFID chip and antenna.

RFID/NFC tags and sensors for different applications other than for use in the invention and their manufacture are well known. Certain preferred embodiments of a security device according to this invention include only an RFID tag. Other preferred embodiments of this invention include an RFID/NFC tag and sensors. Still others may include an NFC tag, subject to the reporting limitations cited above. Both RFID tags, sensors and NFC tags are known and available in a wide variety of sizes useful for different embodiments of the invention, including particularly miniature versions. An RFID/NFC tag contains at least two parts: (a) an electronic circuit (or chip for short) comprising a non-volatile memory for storing and processing information specific to a work of art and circuitry for generating signals, and (b) an antenna for transmitting the signals. Sensors as applied to security devices of this invention are transducers that measure heat, humidity, pressure, movement and other physical or chemical conditions, convert the physical measurement to electricity and send information to a read-out device, reader or data-collection device, or a hub. A security device that includes an RFID/NFC tag with sensors contains one or more sensors that may send information to an RFID/NFC reader through the chip, in which case the sensors are conductively connected to the RFID/NFC chip. The RFID reader may be in a fixed location or be handheld and portable. Alternately, the sensors may transmit independently to a sensor reader. Sensors may require a power source such as a thermoelectric generator, photovoltaic device or battery. An active or semi-active RFID tag also includes a power source, typically a battery. The chip of a passive RFID tag or tag portion includes circuitry for modulating and demodulating a radio-frequency (RF) signal and for collecting DC power from an incident reader; and the antenna of a passive RFID tag includes the ability to receive signal from an RFID reader.

The chip holds four or more data fields in preferred embodiments, of which three are the most germane to the anti-fraud characteristics of the device. The first is the Electronic Product Code or EPC, preferably a 24 field identification code using hexadecimal integers. Information stored in the EPC code allows users to identify specific characteristics of the tag provider, the tag owner, the physical characteristics of the work, authorship, and other data specific to a given work. A second relevant field on the chip is the User Data field, which provides preferably adequate storage to allow a hashed description of unique characteristics of the work (e.g., three dimensional spectroscopy at a defined point on the work) to counter forgeries. A third field stores a private ID number (i.e., a number that is password protected or otherwise kept inaccessible to unauthorized parties) that preferably includes the unalterable serial number embedded in the chip itself (the "TID" or Tag ID number). Data specific to an artwork encoded on the device's chip (Electronic Product Code, User Data, or information in the private field on the chip) can be used to determine if a tag's data has been transferred to a different work (one that does not match the Electronic Product Code definition), has been transferred to a tag that has an alternate chip serial number, or a forged representation (e.g., one that does not match the hashed chemical analysis of a work in the User Data field). Circuitry in a security device according to this invention—either an RFID/NFC tag or RFID tag plus at least one sensor—includes either fixed or programmable logic for encoding information and processing transmission and sensor data, except in those cases where the sensor data is processed by separate readers.

Commercially available RFID tags have the RFID chip and antenna assembled on a substrate. In embodiments of a security device according to this invention that utilize that construction, both RFID tags and RFID tags with sensors, the assembly (chip, antenna, substrate) is referred to as an "RFID inlay." A security device of this invention using a standard RFID inlay includes a label that covers the inlay. Preferred embodiments of tags according to this invention include a "substrate-less" RFID component and fabrication method. For preferred embodiments, the RFID antenna is placed on the label (preferably by printed electronics technology), and the RFID chip is attached to the same side of the label. Placing the RFID assembly directly on the label eliminates the need for a substrate. The label material is preferably absorbent, for the purpose of making the inlay susceptible to failure in the event that solvents are used illicitly to remove the inlay intact. In such embodiments, the adhesive is applied to the side of the label on which the antenna and chip have been placed. This configuration enhances the tag's ability to resist tampering by peeling, cutting, use of solvents or heat.

The multi-layer construction of embodiments of a security device according to this invention is shown in FIG. 1A, which presents in block diagram form an exploded cross-sectional view of tag and system layers. FIG. 1A is not to scale. The tag is preferably a very thin, flat, flexible sheet, having a thickness of about 75-80 micrometers, similar to an extremely thin sheet of paper. This description can refer to one or another 'side" of a layer of the tag, by which is meant one of its two major surfaces, not any of its four edges. The minimum major-surface dimensions of the RFID tag or tag component are determined by the size of substrate layer or if not present, chip- and antenna layer 5. It is currently envisaged a size of approximately 80-120 (e. g. 100) mm×approximately 20-40 (e. g. 30) mm, but the size is not typically critical and can be varied considerably. For NFC tags, the length will be generally shorter than RFID tags and squarer in shape. The size of some layers, for example a cover if one is required by a specific embodiment, can be significantly larger, for example, to accommodate an anti-counterfeiting label outside the area of the RFID and sensors inlay, as opposed to preferentially printing said label on the surface of the device layer farthest from the surface of the work of art or collectible. An optional cover is not included in these illustrations. It is noted that in FIG. 1A the surface to which the construction is applied is shown horizontally oriented, however it will be appreciated that it could as well be vertically oriented or at any angle in between horizontal and vertical.

Figure 1B:
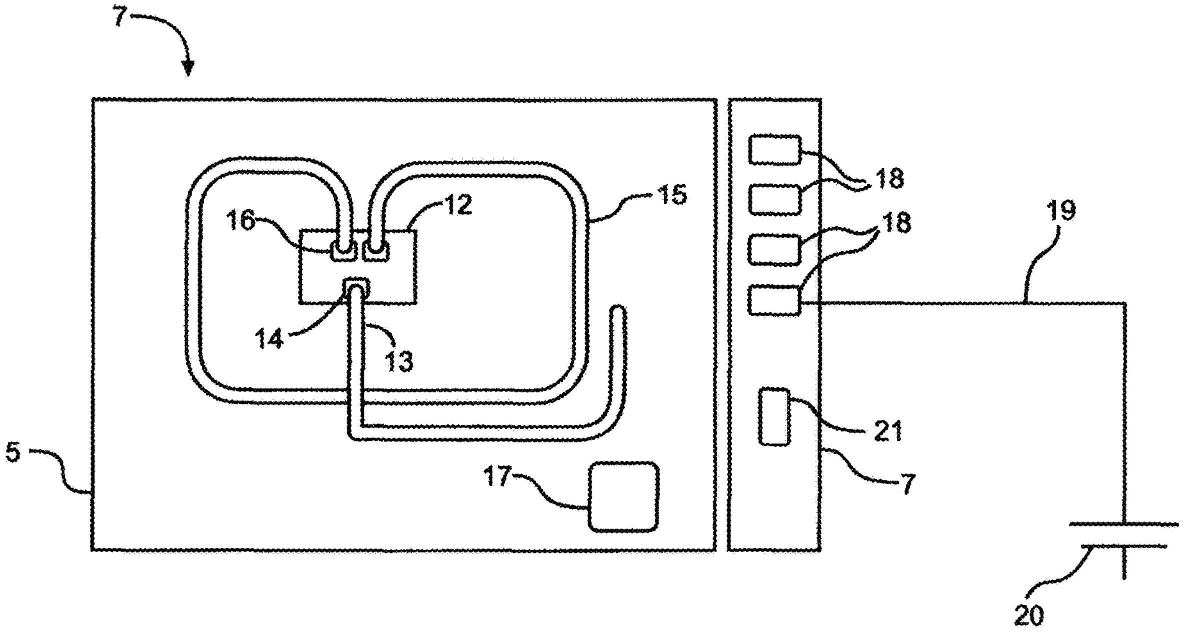
FIG. 1B is a schematic bottom plan view of the exemplary embodiment shown in FIG. 1A showing the chip and antenna in detail.

FIG. 1A shows work of art or collectible 1 that includes surface 2 to which is applied security device 11 that includes RFID tag component 5 and sensors 8, both of which are affixed to surface 2 by adhesive layer 3 or in some preferred embodiments adhesive layers 3 and 10. For purposes of illustration, adhesive layers 3 and 10 are shown as adjacent layers. In a preferred embodiment, Layers 3 and 10 are placed sequentially on the device, so that each adhesive is in contact with the other on the full surface of the device. As described below, adhesive layer 3 attaches to the surface of the work and adhesive layer 10 attaches to the layer holding the chip and antenna assembly, either via substrate or "substrate-less." Considering first the RFID tag component, layers 4 and 5 comprise an RFID. Layer 5 includes an antenna and circuit, and layer 4 is the substrate. Label 6 is attached to layer 5. Label 6 entirely covers and in some embodiments extends beyond layer 5 and (if used) layer 6, and its periphery is adhesively attached to surface 2 (FIG. 1B). As has been noted, preferred embodiments of the RFID tag component are substrate-less. In those embodiments substrate 4 is eliminated, and the components of layer 5 (chip and antenna) are attached to label 6 in the manner described above, after which that assembly is placed on adhesive layer 3. In the embodiment depicted, layer 5 further includes a conductive loop (FIG. 1B). Adhesive layer 3 is preferably cut to the same size (for example, about 100 mm×30 mm) as inlay substrate 4 or, if no substrate 4 is included, RFID tag component 5. Surface 2 may be a viewed surface of the object, or, inasmuch as RFID tags and sensor tags that signal through the RFID circuit do not require line of sight between the reader and the tag or close proximity as is the case with NFC tags, surface 2 may be the reverse side of a basically two dimensional work of art (for example, an oil painting on canvas or wood panel, or works on paper), an inside surface of a rare book, or an inconspicuous spot on a sculpture, or collectible item that is three dimensional (for example, sports memorabilia) without impacting the visual experience of the object. The surface of label 6 farther away from the art object (in this view, the top surface) includes at least one anti-counterfeiting means, one of which shown in FIG. 1B is QR code 17 printed on label 6. A QR code can be included to thwart counterfeiting.

Figure 5:
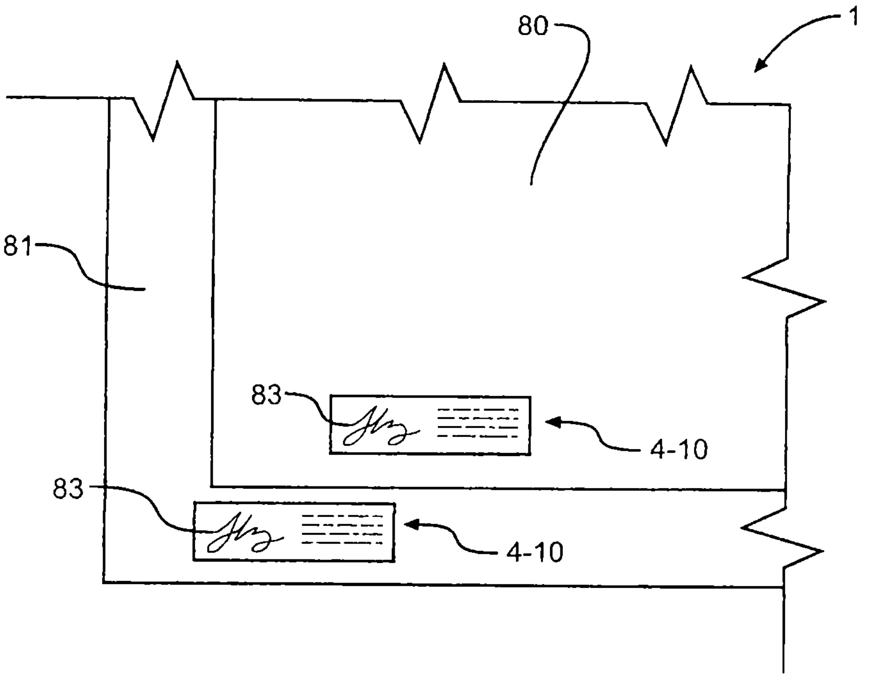
FIG. 5 is a schematic illustration of the application of exemplary security devices according to the invention to both the back of the canvas and frame of a painting.

FIG. 5 is a less schematic than in FIGS. 1A and 1B illustration of two security devices 4-10 affixed directly to a painting 2 (illustrated both to the back of the canvas 80 and to the frame 81; even though normally only one security device connected to one of the elements 80, 81 would be provided two or more security devices can be used on an artwork) including indicia 83 on the top surface thereof. The indicia 83, for example, can give the author's name, the title of the artwork, and other desired information in human-readable form. As an alternative to what is illustrated in FIG. 5 for works on canvas, a device 4-10 can be slipped between the stretcher and the canvas with a heated spatula thus hiding the device from view.

Layers 5 and 6, or when a substrate is used layers 4, 5 and 6, comprise a flexible assembly so that attempts at removal by pulling or peeling cause detectable changes in the operation of RFID tag component 5. The flexibility of the several layers can be determined empirically. The tension required to trigger a fault signal from RFID circuit 5 can be adjusted to reflect the flexural characteristics of object 1. For example, if object 1 is a work on paper or a photograph these assembled layers may have a high level of flexibility, while if object 1 is a work on canvas, these assembled layers may have a lower level of flexibility. A work on a wood panel may have essentially no flexibility. The assembly comprising layers 4, 5 and 6 or layers 5 and 6, as the case may be, is designed to maximize the likelihood that an effort to peel the tag from the surface will lead to a signal of tampering or render components of RFID layer 5 inoperable. The embodiment depicted in FIG. 1A include a sensor assembly comprising sensor substrate 7, a sensor or sensors 8, an external power source (FIG. 1B), and a label or encapsulation device 9, covering the entire security device and peripherally attached to surface 2 by adhesive layer 10. In some embodiments, adhesive layer 10 may be part of adhesive layer 3. In some preferred embodiments, sensor 8 may be a passive RFID component, not requiring an external power source. In those embodiments, a separate label and RFID sensor inlay may be utilized. Encapsulation of the ultra-thin sensor substrate 7 and sensors 8 is discussed in "Decal Electronics: Printable Packaged with 3D Printing High-Performance Flexible CMOS Electronic Systems," by Sevilla et al in Advanced Materials Technologies, October 2016, which is incorporated herein by reference in its entirety. In embodiments in which one or more sensors signal through RFID layer 5, such sensor or sensors are conductively linked to the RFID circuit in layer 5 (FIG. 1A). In embodiment in which one or more sensors signal independently, such sensor or sensors are not so linked.

A power source, as illustrated in FIG. 1B, typically a battery 20, can be provided and in some embodiments a thermoelectric generator 21 or other energy source are added to the device. However, most desirably the security device of the invention is battery-less If sensors are not powered through RFID tag component 5, they are connected to the power source, unless a passive sensor is utilized, in which case the power source is eliminated. If the RFID tag component is passive, it is not connected to the power source, but if it active or semi-active, it is also connected to the power source. The addition of a power source may add an additional layer or, in a preferential embodiment, be attached to the sensors by wire or other conductive material 19 or to RFID chip 12 by wire or the conductive material 22, or to both as required. Preferably a battery power source 20 is located separate from the device (see FIG. 1B). A location separate from the device will reduce the likelihood of any contamination of the work of art by the power source. In an alternative embodiment, no power source will be required. RFID chips configured to respond to on-board sensors and transmit changes in the status of work to which it is attached are in the development stage, and may be preferentially included in embodiments. For further detail, see "Long range battery-less PV-powered RFID tag sensors" by Kantareddy et al at https://arxiv.org/abs/1909.05818 That article is incorporated herein by reference in its entirety.

FIG. 1B is a bottom plan view of an embodiment shown in FIG. 1A. As shown in FIG. 1B, label 6 overlies and extends beyond layer 5 (FIG. 1A), including RFID chip 12, antenna and conductive circuit 15. As noted, in substrate-less embodiments, these elements will have been affixed to the underside of label 6 before label 6 is applied to surface 2. Antenna 13 is connected to terminal at 14 on chip 12. In the embodiment shown in FIG. 1B a strip of conductive material 15 is included in layer 5 (FIG. 1A). Conductive loop 15 surrounds chip 12 and is connected to chip 12 at terminals 16. In certain embodiments, conductive loop 15 is not included. Four sensors 8 are located on substrate 7, which is affixed on surface 2 adjacent to the RFID tag components 12, 13 and 14. In some embodiments utilizing an RFID inlay, substrate 7 may be an extension of substrate 4. Encapsulation device/label 9 overlies sensors 8 and substrate 7, and in some embodiments peripherally is adhesively affixed to surface 2.

A security device according to this invention includes at least one element that is sensitive to pulling or peeling so as to alter or eliminate the signal from the RFID chip. Three such elements are shown in FIG. 1B. One is label 6, which is adhesively connected to layer 5 and is composed of a fragile, thin material designed to tear on peeling. Another is antenna 13. Antenna 13 is constructed and configured to break if label 6 is bent in any direction. Antenna 13 is very thin so as to break if bent. The RFID tag or, if used, the RFID inlay can be provided with micro-incisions (not shown) or otherwise provided with weak spots in order to increase the likelihood of tearing of the RFID layer 5 in the event of attempted removal, which leads to antenna 13 failure. Also shown in FIG. 1B is a strip of conductive material affixed to label 6, here a conductive loop 15 that surrounds chip 12 and is connected to chip 12 at terminals 16. Bending or breaking conductive loop 15 changes capacitance and alters the signal from the RFID chip 12. Variations of construction and placement of conductive elements are disclosed in U.S. Pat. No. 8,884,764, incorporated by reference herein, which discloses a conductive element electrically coupled to an RFID tag that affects capacitance, inductance or resistance, wherein deformation or breakage of the conductive element causes RFID circuitry to issue an alarm, either eliminating or causing a detectable change in the tag's signal, such as by changing a bit or bits of its digital message.

The Adhesive 3 in FIG. 1A can be any adhesive of strong bonding strength that is resistant to solvents and may be selected from among many commercially available adhesives. Preferably adhesive layer 3 is a solvent-resistant adhesive. For use in one embodiment of the present invention, the adhesive is one that can be removed completely and without residue utilizing heat, solvents, or both, without altering the surface of the work of art or collectible-whether that is the back of a canvas painting, for example, or ancillary materials such as frames, matting, stretchers or a non-critical surface of a sculpture or collectible—and without altering its chemical composition or appearance. Any adhesive that meets these criteria may be used in systems and methods of this invention. At the present time, the preferred adhesive is the non-invasive non-destructive heat-activated adhesive BEVA® 371 or BEVAR, an adhesive widely used in the art conservation world and referred to collectively in this document as BEVA® 371. BEVA® 371 was developed in the 1970's by Gustav A. Berger, an artist and conservator. BEVA® causes no contractions, expansion or softening of the materials to which it is applied. See, Berger, G. A.1972, "Testing adhesives for the consolidation of paintings," *Studies in Conservation*17: 173-93. Its chemical composition has been widely published, and it is the subject of many scholarly works, for example see "Original and reformulated BEVA® 371: Composition and assessment as a consolidant for painted surfaces" by Ploeger et al, and "Studies in Conservation," July 2015. BEVA® 371 (ethylene vinyl acetate 371) is manufactured by Conservator's Products Company, Flanders, New Jersey is sold as a heat-activated adhesive in various forms through distributors such as Conservation Support Systems, Santa Barbara, California and Talas, Brooklyn, New York. A commercially available form of BEVA® 371 is a paper release sheet-covered layer of the adhesive on a silicon-coated Mylar® release sheet frequently used for repairing tears in paintings. For such repair, the ethylene vinyl acetate-coated Mylar® (polyester film) release sheet is first cut to the proper dimensions for a given work (either backing the entire work or repairing a specific tear or weak area). The paper release sheet is removed to expose the adhesive layer, and the Mylar® release sheet placed adhesive side down on the back side of the canvas or other artistic medium (paper, wood, fabric, metal and others). The silicone-coated Mylar release sheet is removed when the BEVA® 371 has bonded with the surface. Backing of various kinds (typically, polyester film such as Mylar®) is then placed on the ethylene vinyl acetate layer and heat applied, completing the repair.

For use in the invention the foregoing form of BEVA® 371 is preferred; that is, a paper release sheet-covered layer of the adhesive on a silicon-coated Mylar® release sheet. For conservation, a version of BEVA® 371 is applied that has a melt point of 150° F. (65° C.). For the present invention, however, a BEVAR 371 formulation with a higher melt point of over 150° F.—e.g. 151-170° F. (66-77° C.)—is preferred. The high-melt point BEVA® 371 is cut either manually or preferably by die cutting that matches the size of the substrate 4 or, if not used, layer 5, and applied to the work of art or collectible as layer 3 (FIG. 1A), and bonded to surface 2 by heating. After cooling, the Mylar® release sheet is removed, and the RFID tag or tag component is applied onto the exposed surface of the adhesive layer 3 with the next layer, either layer 4 or layer 5 as the case may be, in contact with adhesive layer 3 and adhesively affixed by reheating to 151-170° F. (66-77° C.). The heat sensor 8 on the RFID with sensor tag is reset after installation to send an alert at a temperature (e.g. about 120° F.) well below the melt point of the BEVA adhesive.

As described above, in one preferred embodiment high melt point BEVA® 371 (layer 3 in FIG. 1A) is applied over a layer of adhesive with a high peel strength (layer 10 in FIG. 1A) in the manufacturing process. A rubber resin adhesive-such as Acucote P2000 sold by Fedrigoni Self-Adhesives of Verona, Italy—is preferred for this second layer 10 of adhesive, but any aggressive high performance adhesive that is compatible with BEVAR will suffice. In this embodiment, the layer 10 adhesive is directly attached to the RFID inlay, and is attached on its other side to the BEVA® 371 layer, which is in turn attached to the surface 2 of the work of art. Alternatively, a BEVA® 371 patch is applied to the surface of the work of art initially and—once cooled—the RFID tag with a high peel strength adhesive placed into the exposed BEVA® 3 layer. It is within the state of the art that the two adhesives can be applied in successive runs in a laminated type application to the inlay by RFID converter firms. The tags are peeled off the Mylar® release layer and positioned on a work of art at the time of installation, and heat applied.

High melt point BEVAR 371 can subsequently be reversed (removed from the surface 2 of a work) safely and without residue by reheating. When the security device is removed by an unauthorized party or by an authorized party using heat, the RFID tag may be disabled by the peeling required to lift the tag, and the RFID with sensor tag is rendered inoperative, as explained below. If an authorized party wishes to re-establish an RFID or sensor tag relationship to the work, a new security device according to this invention can be attached and registered with the secure database system.

RFID inlay 5-6 in FIG. 1A or substrate-less RFID circuit layer 5 can be protected from attempts to remove it by heat in one or more of several ways. First, the device can be placed on a surface of a work of art or collectible that is inaccessible to heat without risk of damaging the object, thus deferring theft. Second, circuitry in RFID chip 12 or in a separate sensor 8 can include a temperature sensor (active, semi-active or passive) designed to send an alert, a tampering notice or alarm, when the temperature of the RFID or RFID with sensor tag rises above a pre-set temperature significantly below the melt point of the high melt point BEVAR 371 in layer 3, if an attempt is made to melt adhesive layer 3 and remove the device. Third, circuitry in chip 12 can be designed to fail (an open circuit) when the temperature of the RFID or RFID with sensor tag rises above a pre-set temperature significantly below the melt point of the high melt point BEVAR 371 in layer 3, if an attempt is made to melt adhesive layer 3 and remove the device.

Attached security device according to this invention also provides protection when attempts to remove it by heating, pulling, or peeling are done with the aid of a solvent. The label 6 will, under preferred embodiments, decompose when subjected to solvents or separate from the chip and antenna, disabling the antenna 13, which sends an alarm or causes the tag to fail, or both. In embodiments with sensors 8, an included sensor may detect the presence of solvents or the conductive material of the antenna 13 may dissolve, in which case the introduction of one or more chemical solvents will send an alarm Antenna 13 can be designed to fail at a pre-set temperature by utilizing specialized temperature-sensitive conductive inks that default (break) at the pre-set temperature, or through the use of metal compounds on etched circuitry that will break at a pre-set temperature in the same range. This feature would disable an RFID tag if a temperature sensor is not included. Other suitable temperature-dependent failure means are within the skill of the art. If the security device is removed intact from the work by melting adhesive layer 3, the temperature-dependent failure means of the temperature-sensing-and-reporting feature of the tag will assure that the tag has already been rendered inoperable or has been reported as having exceeded its temperature limit, thus making transfer to a forged work futile, and the removal of a work that has been "de-tagged" impossible, since an alarm will have been sent.

Protection against physical tampering (pulling or peeling) is provided by at least one means described above in connection with FIG. 1B to detectably alter or eliminate the tag's signal, if removal by pulling or peeling is attempted. First, if conductive element 15 is included, deformation (bending) or breakage of the conductive element 15 causes RFID circuitry to issue an alarm, either eliminating or causing a detectable change in the tag's signal, such as by changing a bit or bits of its digital message. Second, chip 12 may be attached to label 6 by a strong adhesive, while conductive element 15 may be attached to label 6 by a weaker adhesive (e. g. with a T-peel value of at least about 20% less) so that pulling or peeling causes deformation or breakage of the conductive element 15 where it contacts the chip. Third, antenna 13 is designed to detect pulling or peeling by breaking, as has been described above. Breaking at any position along the antenna 13 will change its frequency, which is detected. For example, messages from the tag may become unreadable. Breaking at or near terminal 14 will result in a loss of signal transmission by the tag, which is detected.

Artworks and collectibles vary greatly in the medium employed and the flexural strength of that medium. To assure the successful incapacitation of the chip when a tag is pulled or peeled, four variables will define the inlay's characteristics—(1) the pressure required on the tamper alarm in the chip; (2) the fragility of the label 6 for the RFID or substrate 7 for the sensor inlay, as a result of its thinness and chemical composition; (3) the bonding strength of the RFID or sensor inlay adhesive; and (4) the sensitivity to solvents, if used. An RFID tag or RFID with sensors tag placed on a photograph or work on paper, for example, will utilize a relatively low tension limit for a tamper alarm, and a highly fragile and flexible substrate 5. A tag placed on a rigid wood panel, on the other hand, may allow for a higher tamper alarm tension, a more rigid substrate 5, and higher bonding strength adhesive. These features can be chosen empirically, by trial and error, keeping in mind that label 6 must flex under physical tampering.

As stated above, some embodiments of a security device according to this invention include mechanisms to thwart counterfeiting. In both RFID-only embodiments and RFID-plus-sensors embodiments, the surface farthest from the artwork or collectible is a preferred site for anti-counterfeiting features. Referring to FIG. 1B, QR code 17 is placed on RFID-component label 6. The anti-counterfeiting means could also be placed on sensors label 9. Labels on both embodiments include at least one anti-counterfeiting means. Any suitable means can be included. There are a variety of commercially available options to thwart any attempt to create counterfeit RFID tags or RFID with sensors tags, and to provide visual evidence of an unauthorized attempt to remove the RFID or sensor tag. The options, many of which have been developed for use in the financial services industry to prevent credit card fraud, include among others: color-shifting ink; holograms; and high definition QR (Quick Response) code technology.

1. Color-shifting inks—inks that appear to have different spectral characteristics, or alter color upon rubbing and are hard to replicate, are available.
2. Holograms—holographic images similar to those used on some currencies can be added to the label, deterring would-be counterfeiters.
3. High definition QR technology—Two QR codes are printed on the label, one in standard form and one with a level of resolution available only from state of the art printing facilities. The standard QR code contains information identifying the work of art associated with the tag; the high definition QR code verifies its resolution level to the reader, thereby confirming or invalidating the authenticity of the information stored in the standard QR code.
4. Chemicals housed on the tag or a separate cover label that, when combined via twisting, peeling, or solvents change color.
5. Uniquely encoded chemical "taggants" that are printed into the tag or a cover label to foil counterfeiting.

Users of the present invention may opt for one or more of the label's anti-counterfeiting options. In certain embodiments, the anti-counterfeiting means are passive and read visually, for example, by a sensors reader that requires line-of-sight access to the tag.

As stated above, this invention includes mechanisms for adhesively affixing to an artwork or a collectible a security device according to the invention. An embodiment of such of a mechanism according to this invention will be described for the security device shown in FIG. 1A. Adhesive layer 3 is applied and adhered to surface 2 of an artwork or a collectible 1. Adhesives used may be any commercially available adhesive with high bonding strength and resistance to solvents. In embodiments that include a fully reversible attachment directly to surface 2 of a work of art or collectible 1, a user would apply the presently preferred adhesive, high melt BEVA® 371, in the form of a layer of adhesive on a Mylar® release sheet. In a preferred embodiment, tags will be supplied on a peel-off backing with both adhesives in place, as described above. The BEVA® 371 layer is the second adhesive applied to the tag, and faces the surface to which the device is attached. For application to the back of a painting, for example, there is currently envisaged a device size of approximately 100 mm×22 mm, but the size is not critical and can be varied considerably. The BEVA® 371 layer 3 is adhered to surface 2 by the application of heat via use of a heat gun, heating iron, heated spatula or similar device, or heating table at about 130-150° F. (54-66° C.). To maximize the anti-tamper features, the high melt version of BEVA® 371, is preferable. In that case, the melt temperature is 151-170° F. (66-77° C.). Attempts to remove the tag via heat, if the higher melt temperature formulation of BEVAR 371 is used, not only will destroy the antenna 13 or conductive circuit 15, but also risk permanent damage to the artwork, thus thwarting tampering attempts.

In those embodiments that do not include a substrate 4 (FIG. 1A) but do include sensors 8, as is shown in FIG. 1B, the RFID tag component comprises label 6 on which are affixed RFID chip 12, antenna 13, which is connected to terminals at 14 on chip 12 and conductive element 15 which is attached at terminals 16. In addition to those elements there is a set of sensors 8 designed to counter tampering from pressure (peeling or pulling), solvents, heat, changes in location, or other critical factors. In one preferred embodiment, one or more sensors 8 may require a power source, possibly a battery 20. The battery as illustrated is remote from substrate 7 and from the security device in its entirety in order that, in the unlikely event of damage to the battery that releases its content, no damage will occur to the work of art. It may be possible within the work of the art to place the battery proximate to the security device. In other embodiments, a thermoelectric generator, photovoltaic device, or other battery-less energy source 21 will harvest energy from the environment or from the tampering event (in, for example, an attempt to remove the tag by heat) that will activate a sensor 8 that will signal either via the chip 12 or via direct connection to the sensor 8.

In other respects, the embodiment with sensors 8 is, to the extent that the materials and conductive elements of layer 5 permit, similar to the plan view provided in FIG. 1B. The label 6 is flexible in order to induce damage to the antenna 13 if pulled or peeled. Antenna 13 is very thin so as to break if bent. Micro-incisions will be employed if deemed feasible for a particular embodiment. The configuration of chip 12, antenna 13, impedance loop 15 will be maintained as the base configuration, subject to requirements of the sensors and possible thermoelectric generator mounted on the substrate 4 (or a separate substrate 7 if required). Deformation or breakage of the conductive element 15 causes an alarm to be sent.

Figure 2:
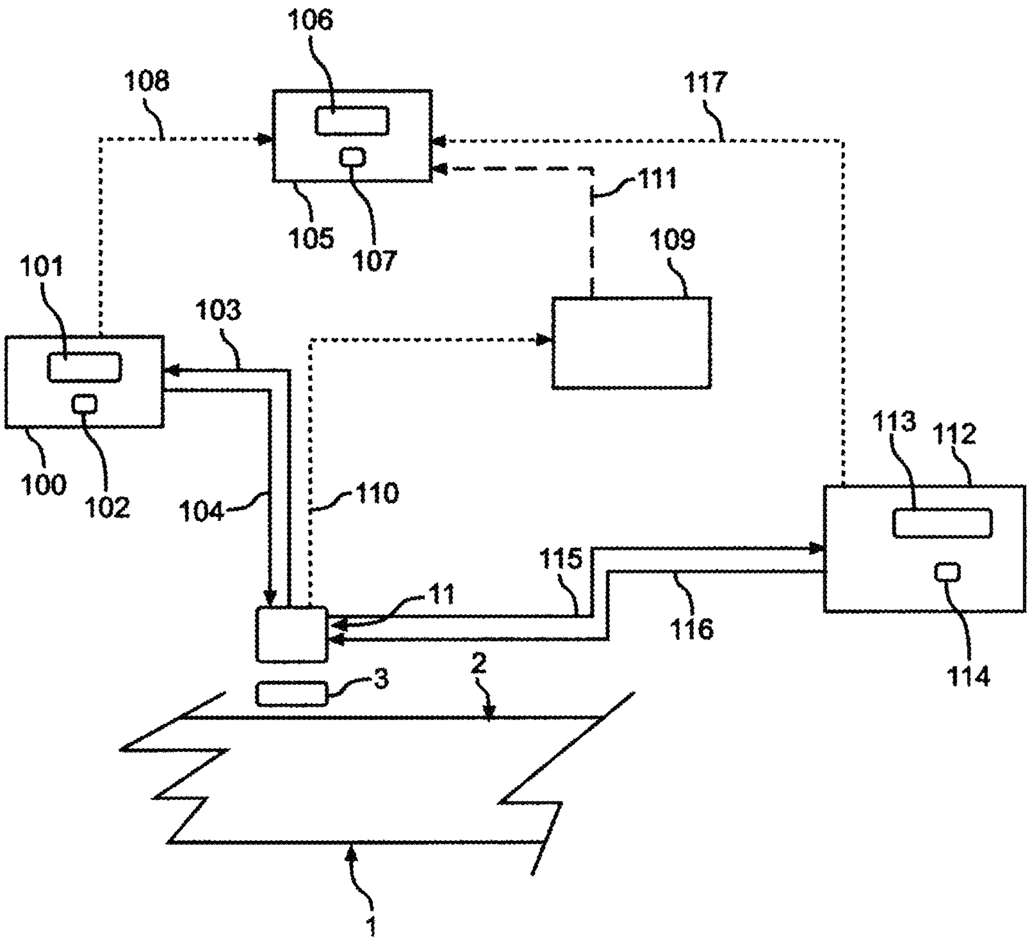
FIG. 2 is a schematic representation of a security system according to an exemplary embodiment of the invention.

FIG. 2 presents a schematic representation of a security system according to an exemplary embodiment of the invention. The security system includes an RFID or RFID and sensor reader 100 that includes a computer, an artwork or a collectible 1 having affixed thereto an RFID tag or RFID with sensors tag 11. Certain system embodiments also include a handheld or fixed receiver 105, also including a computer, capable of receiving messages from reader 100. Reader 100 and, if included, receiver 105 comprise a monitoring system. A separate read-out system with active or passive sensor reader 112 will be included in certain embodiments. Readers 100 and 112 may include a display 101 or 113, and may alternately or in addition include an aural alarm 102 or 114. Similarly, reader 105 may contain a display 106 or an aural alarm 107, or both. Adhesive layer 3 (FIG. 1A) is shown intermediate security device (tag) 10 and surface 2 of object 1.

Device 11 may comprise an active or semi-active RFID tag without sensors 8; or device 11 may comprise RFID and sensors tag (FIG. 1A). Most preferably, the RFID tag or RFID tag component is passive. If the former, reader 100 is passive, that is, it receives signals 103 from device 11, but it does not send signals 104 to the device. If the latter, reader 100 is active, that is, it not only receives signals 103 from device 11, it also sends signals 104 to device 11. In normal operation signals 103 identifying device 11 and signifying nominal status are sent by device 11 through its antenna to reader 100 as frequently as desired. If the latter, wherein device 11 is passive, reader 100 is active and sends signals 104 to device 11 to cause device 11 to respond with signals 103. As has been described, in certain embodiments sensor operations require a separate reader, computer, hubs and gateway for receiving data and, if a remote receiver 105 is included in the system, for sending it to that receiver 105. Referring to FIG. 2, there is shown separate sensor reader 112, which may be active or passive. It receives signals 115 from device 11, and, if active, sends signals 116 to device 11. Through connection 117, reader 112 may communicate with remote reader 105. Readers 100 and 112 may be mobile, as hand-held, or fixedly mounted at a location suitable for receiving signals 103 and 115, respectively, and, if device 11 is passive, at a location also suitable for sending signals 104 and 116 to device 11. Reader 112 may receive signals visually, in which case line-of-sight access to device 11 is required. Certain preferred embodiments include a remote receiver 105 that is capable of receiving messages from reader 100 and, in some embodiments reader 112, through communication connection 108 and 117, which may be wires, near-field wireless connection or by far-field wireless connection. If a remote receiver 105 is included in the system, reader 100 and, if included, reader 112, include means to send messages to the remote receiver. Reader 100 is capable of detecting altered status of device 11 (tampering). As has been explained, altered status may be reflected by a lack of signal from device 11, if it has been incapacitated, or it may be reflected by an altered status signal 103. In response to detection of altered status, reader 100 or, if the system includes it, remote receiver 105 generates a message to that effect. A tampering message may be displayed on display 101 or display 106, or both. Alternatively or in addition, detection of altered status may cause reader 100 to sound alarm 102 or cause remote receiver 105 to sound alarm 107, or both. In certain embodiments reader 112 is capable of detecting altered status of device 11 (tampering). As has been explained, altered status may be reflected by a lack of signal from device 11, if it has been incapacitated, or it may be reflected by an altered status signal 115. In response to detection of altered status, reader 112 or, if the system includes it, remote receiver 105 generates a message to that effect. A tampering message may be displayed on display 113 or display 106, or both. Certain embodiments may include a reader 100 that receives signals 103 from more than one device 11. For example, an active reader 100 may sequentially interrogate a first device 11, then a second device 11, and so on. In such embodiments, it is preferred that status messages and tampering messages be displayed in conjunction with device identification, so that which device has been tampered with is conveyed to the user.

Also shown in FIG. 2 is a reader for an anti-counterfeiting means that is included in certain preferred embodiments. FIG. 1B, for example, illustrates inclusion of a high definition QR code 17 in the device. In that case reader 109 is a QR high definition reader that receives signals 110 from device 11. Alternately or in addition, reader 109 may read and respond to inks or holograms included in label 6. It will be appreciated that, unlike an RFID or sensor tag, some anti-counterfeiting readers 109 require line-of-sight access to anti-counterfeiting means 17 (FIG. 1B), whether it is placed on label 6 or label 9.

Preferably, signals 103 and 104 will be encrypted, as will signals 110, signals 116 and, if not visual, signals 115. Also preferably, readers will be programmed to upload information and alarms to secure databases managed by both the user and a central secure system provided by the vendor.

The invention is intended to provide the secure, non-invasive, tamper-resistant anchoring of an RFID tag or RFID tag with sensors that can provide security, location tracking, and protection against theft. Both near field and far field communications circuits may be employed to maximize user access to chip information.

The security device of the invention is designed to address, and is capable of addressing, the worst-case scenarios for theft of a valuable work—the physical removal of it from its frame, stretcher or other associated material (e.g. cutting an oil painting on canvas out of its stretcher) or the successful transfer or replication of the tag's encoded data to a different object. However, its full functionality need not be used at all times or in all applications. At some or all times an authorized user may be interested in using the RFID or sensor tag only to track the physical location of a work (i.e., is not concerned with theft or forgery), in conjunction with, for example, inventory management or exhibition logistics. If the user is interested only in tracking at all times (i.e., there is no need for perimeter security features or maintaining a secure identification number), a device 11 can be attached directly to non-sensitive elements such as a frame, stretcher or packing material.

As stated earlier, RFID and NFC tags share certain characteristics and capabilities but differ in major respects. The above description of RFID and sensors applies equally to NFC tags with the following qualifications: (1) tampering attempts are not transmitted automatically by NFC tags; (2) automated tracking of the location of a work of art within spaces equipped with fixed readers is not available for NFC tags; (3) sensors located on a work of art and linked to RFID circuitry may not be readily adapted to NFC's inductive coupling technology. Anti-tampering functionality associated with RFID tags—the tag's failure upon efforts to remove it and transfer it to forged or counterfeit works—applies equally to NFC tags.

Figure 3:
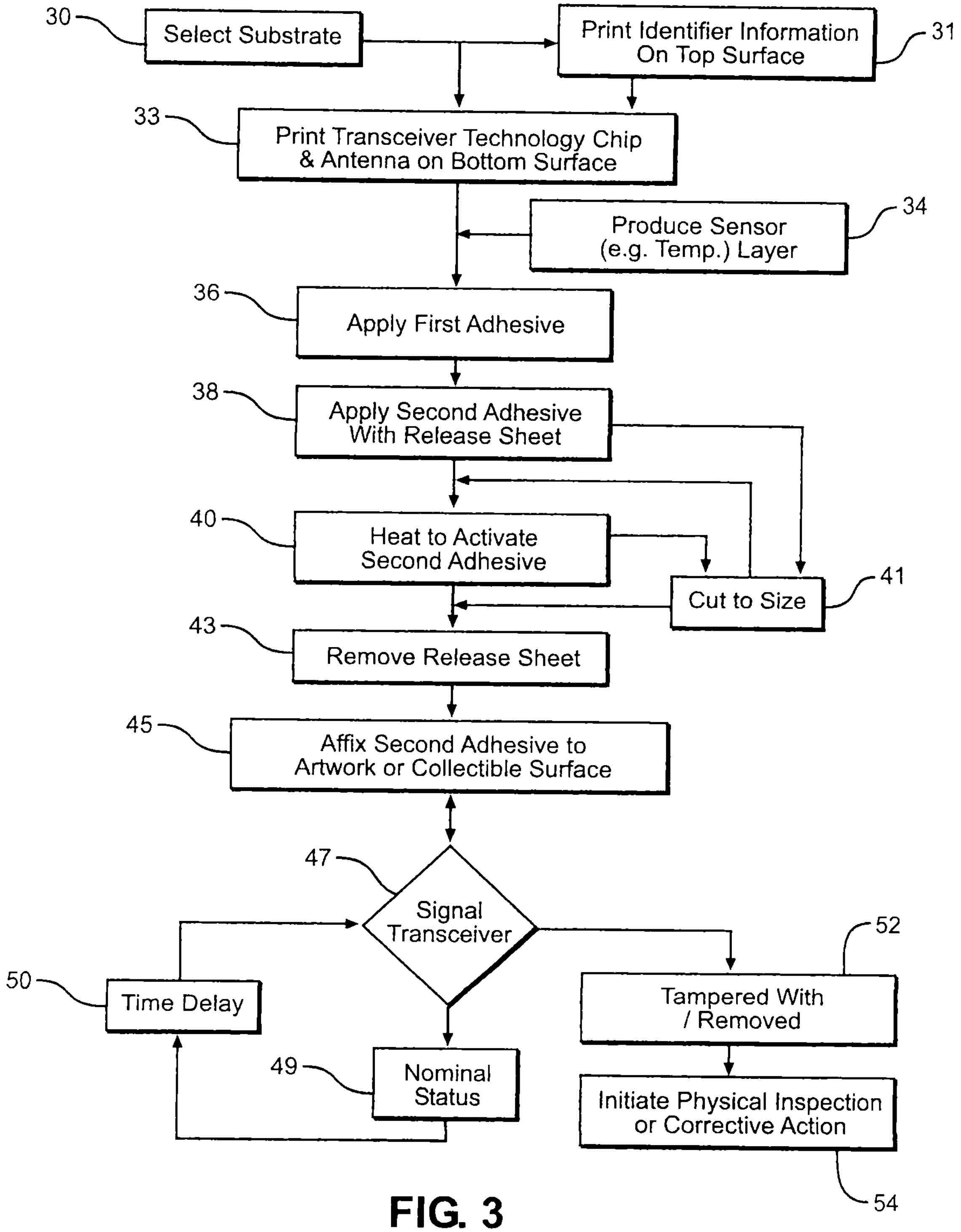
FIG. 3 is a high level flow chart illustrating an exemplary method of manufacture and utilization of a tamper-resistant security device according to the invention.

FIG. 3 provides a high level flow chart illustrating an exemplary method of the manufacture and utilization of a security device for artworks or collectibles according to the invention. A substrate or label is selected, such as a paper label, at 30 and if desired identifier information or indicia of any type may be printed on the top surface of the substrate or label as indicated at 31. A suitable paper for the substrate or label is, for example only, Powercoat XD80, 3 mil thick, sold by Arjowiggins Paper of Stoneywood, UK. Using conductive ink a transceiver technology chip of any desired configuration and an antenna 13 are printed and provided on the bottom surface of the label or substrate as indicated at 33. If desired one or more layers with environmental sensors, such as a temperature sensor, may be produced as indicated at 34 and if so are layered with the printed antenna 13 etc. Then as indicated at 36 a first adhesive is applied.

The first adhesive applied at 36 is preferably a high peel strength adhesive (T-peel value>about 10 pli). After that, as indicated at 38, a second adhesive with release sheet is operatively connected to the first adhesive, the second adhesive engaging and compatible with the first adhesive. The second adhesive is activated by heat (e.g. >150° F. but <170° F. using any heating mechanism earlier described) at 40. The second adhesive is preferably a non-invasive non-destructive heat-activated adhesive such as BEVA® 371. If desired the element produced at 40, or at 38 before 40, maybe cut to size using any conventional appropriate device as indicated at 41. Ultimately the release sheet is removed at indicated at 43 and the second adhesive is affixed to an artwork or collectible as indicated at 45.

Once the artwork with security device is displayed or stored then it communicates with a signal transmitter as indicated at 47. For example if the security device has an RFID chip applied at 33 then a reader is provided at 47 which periodically polls the artwork security device. If there has been no tampering then the reader will indicate a nominal status as illustrated at 49, which will be repeated at a desired interval (e. g. one-thirty minutes) as indicated by the time delay 50. However if there has been tampering or removal of the security device as indicated at 52 then an alarm may sound, a physical inspection initiated, and/or corrective action is taken as indicated at 54.

Figure 4:
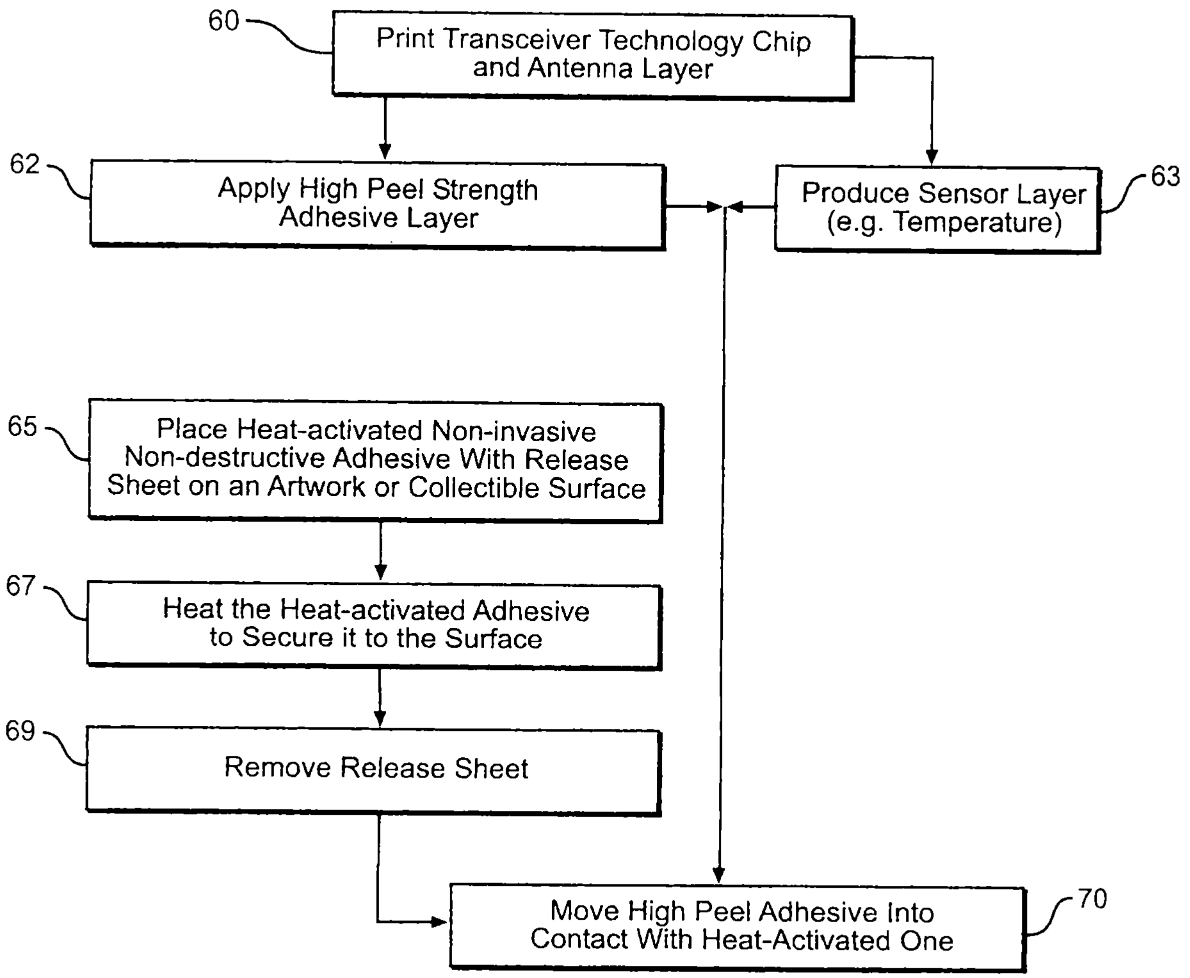
FIG. 4 is a high level flow chart for another exemplary method of manufacture and utilization of a tamper-resistant security device according to the invention.

FIG. 4 schematically illustrates an alternative to the method of FIG. 3 method of production and utilization of a security device according to the invention. As indicated at 60 a layer with a transceiver chip and antenna 13 is printed and provided and a high peel strength adhesive layer is provided thereon as indicated at 62 either before after the temperature sensor layer indicated at 63 is provided.

Distinct from procedures 62, 63 a heat activated non-invasive and non-destructive adhesive with a release sheet is placed on a surface of an artwork or collectible as indicated at 65. Heat is applied to the adhesive as indicated at 67 to secure it to the surface, and then as indicated at 69 the release sheet is removed. Ultimately, as indicated at 70, the high peel strength adhesive is moved into contact with the heat-activated one so that the security device including the chip and antenna are affixed in a tamper-resistant manner to the artwork or collectible.

The foregoing description and accompanying drawings illustrate the principles, presently preferred embodiments, and modes of operation of the invention, however the invention should not be construed as being limited to the particular presently preferred embodiments discussed above. Additional variations of those embodiments can be made without departing from the scope of the invention which scope should be accorded the broadest interpretation of the appended claims so as to encompass all equivalent devices and methods consistent with the prior art.

What is claimed is:

1. A battery-less tamper-resistant security device adhesively affixable to a surface of an artwork or collectible by an appropriate adhesive comprising:

a transceiver technology chip and antenna; and a label operatively connected to said transceiver technology chip and antenna;

wherein said transceiver technology chip and antenna send responses to signaling by a signaling device to said security device and report its status as nominal or having been tampered with;

wherein said security device is sensitive to physical tampering or removal so that if a solvent is applied thereto affecting said antenna, or if bent, torn, or removed, said security device will report its status as having been tampered with; and further comprising high melt point ethylene vinyl acetate non-invasive non-destructive heat activated adhesive associated with said label and said transceiver technology chip and antenna, said adhesive affixed to a surface of an artwork or collectible.

2. A security device as recited in claim 1 further comprising a high peel strength adhesive between said non-invasive non-destructive adhesive and said transceiver technology chip and antenna.

3. A security device as recited in claim 1 further comprising at least a temperature sensor operatively connected to said transceiver technology chip and antenna so that said temperature sensor will indicate if the temperature sensed is greater than a predetermined level less than the melt point of said non-invasive non-destructive adhesive and if so will report its status as having been tampered with.

4. A security device as recited in claim 1 wherein said transceiver technology chip is selected from the group consisting essentially of RFID chips, NFC chips, and both RFID and NFC chips.

5. A security device as recited in claim 2 further comprising at least one electrically conductive element sensitive to bending or tearing operatively connected to said chip and antenna and further comprising a third adhesive connecting said electrically conductive element to said label, said third adhesive having a peel strength enough less than that of said high peel strength adhesive so that if said security device is bent or torn said electrically conductive element will break and said security device will report its status as tampered with.

6. A security device as set forth in claim 2 wherein said high peel strength adhesive comprises a rubber resin adhesive compatible with high melt point ethylene vinyl acetate adhesive.

7. A security device as recited in claim 1 wherein said chip is mounted on a substrate.

8. A security device as recited in claim 7 wherein said substrate is paper having top and bottom surfaces and wherein said top surface has human readable identifier information provided thereon.

9. A battery-less tamper-resistant security device adhesively affixable to a surface of an artwork or collectible by an appropriate adhesive comprising:

a transceiver technology chip and antenna; and a label operatively connected to said transceiver technology chip and antenna;

wherein said transceiver technology chip and antenna send responses to signaling by a signaling device to said security device and report its status as nominal or having been tampered with;

wherein said security device is sensitive to physical tampering or removal so that if a solvent is applied thereto affecting said antenna, or if bent, torn, or removed, said security device will report its status as having been tampered with;

a non-invasive non-destructive heat activated adhesive associated with said label and said transceiver technology chip and antenna, said non-invasive non-destructive adhesive affixed to a surface of an artwork or collectible; and at least a temperature sensor operatively connected to said transceiver technology chip and antenna so that said temperature sensor will indicate if the temperature sensed is greater than a predetermined level less than the melt point of said non-invasive non-destructive adhesive and if so will report its status as having been tampered with.

10. A battery-less tamper-resistant security device adhesively affixable to a surface of an artwork or collectible by an appropriate adhesive comprising:

a transceiver technology chip and antenna;

a label operatively connected to said transceiver technology chip and antenna;

wherein said transceiver technology chip and antenna send responses to signaling by a signaling device to said security device and report its status as nominal or having been tampered with;

wherein said security device is sensitive to physical tampering or removal so that if a solvent is applied thereto affecting said antenna, or if bent, torn, or removed, said security device will report its status as having been tampered with;

a non-invasive non-destructive heat activated adhesive associated with said label and said transceiver technology chip and antenna, said adhesive affixed to a surface of an artwork or collectible;

a high peel strength adhesive between said non-invasive non-destructive adhesive and said transceiver technology chip and antenna; and at least one electrically conductive element sensitive to bending or tearing operatively connected to said chip and antenna and further comprising a third adhesive connecting said electrically conductive element to said label, said third adhesive having a peel strength enough less than that of said high peel strength adhesive so that if said security device is bent or torn said electrically conductive element will break and said security device will report its status as tampered with.

11. A security device as recited in claim 9 wherein said chip is mounted on a paper substrate having top and bottom surfaces and wherein said top surface has human readable identifier information provided thereon.

12. A security device as recited in claim 10 further comprising a conductive loop surrounding said chip and operatively connected to said chip at terminals.

13. A security device as recited in claim 12 wherein said non-invasive non-destructive adhesive is high melt point ethylene vinyl acetate.

14. A security device as recited in claim 10 wherein said chip is mounted on a paper substrate having top and bottom surfaces and wherein said top surface has human readable identifier information provided thereon.

15. A security device as recited in claim 12 wherein said non-invasive non- destructive adhesive is high melt point ethylene vinyl acetate.

16. A security device as recited in claim 9 wherein said transceiver technology chip is selected from the group consisting essentially of NFC chips, and both RFID and NFC chips.

17. A security device as recited in claim 10 wherein said transceiver technology chip is selected from the group consisting essentially of NFC chips, and both RFID and NFC chips.

18. A security device as recited in claim 1 further comprising a conductive loop surrounding said chip and operatively connected to said chip at terminals.

19. A security device as recited in claim 9 further comprising a conductive loop surrounding said chip and operatively connected to said chip at terminals.

20. A battery-less tamper-resistant security device adhesively affixable to a surface of an artwork or collectible by an appropriate adhesive comprising:

a transceiver technology chip and antenna; and a label operatively connected to said transceiver technology chip and antenna;

wherein said transceiver technology chip and antenna send responses to signaling by a signaling device to said security device and report its status as nominal or having been tampered with;

wherein said security device is sensitive to physical tampering or removal so that if a solvent is applied thereto affecting said antenna, or if bent, torn, or removed, said security device will report its status as having been tampered with;

a non-invasive non-destructive heat activated adhesive associated with said label and said transceiver technology chip and antenna, said adhesive affixed to a surface of an artwork or collectible;

a high peel strength adhesive between said non-invasive non-destructive adhesive and said transceiver technology chip and antenna; and wherein said high peel strength adhesive comprises a rubber resin adhesive compatible with high melt point ethylene vinyl acetate adhesive.

* * * * *